United States Patent
Kronemeyer et al.

(10) Patent No.: US 9,199,508 B2
(45) Date of Patent: Dec. 1, 2015

(54) WHEEL COVER

(71) Applicants: Brian S. Kronemeyer, Hudsonville, MI (US); Michael A. Thern, Plano, TX (US)

(72) Inventors: Brian S. Kronemeyer, Hudsonville, MI (US); Michael A. Thern, Plano, TX (US)

(*) Notice: Subject to any disclaimer, the term of this patent is extended or adjusted under 35 U.S.C. 154(b) by 295 days.

(21) Appl. No.: 13/916,165

(22) Filed: Jun. 12, 2013

(65) Prior Publication Data
US 2013/0334869 A1    Dec. 19, 2013

Related U.S. Application Data

(60) Provisional application No. 61/661,034, filed on Jun. 18, 2012.

(51) Int. Cl.
*B60B 7/10* (2006.01)
*B60B 7/06* (2006.01)
*B60B 7/02* (2006.01)
*B60B 7/04* (2006.01)
*B60B 7/12* (2006.01)
*B60B 7/00* (2006.01)

(52) U.S. Cl.
CPC ... *B60B 7/06* (2013.01); *B60B 7/02* (2013.01); *B60B 7/04* (2013.01); *B60B 7/063* (2013.01); *B60B 7/066* (2013.01); *B60B 7/12* (2013.01); *B60B 7/0066* (2013.01); *B60B 2900/111* (2013.01); *B60B 2900/112* (2013.01); *B60B 2900/113* (2013.01); *B60B 2900/1216* (2013.01); *B60B 2900/321* (2013.01); *B60B 2900/572* (2013.01); *Y10T 29/49542* (2015.01)

(58) Field of Classification Search
CPC .......... B60B 7/00; B60B 7/0073; B60B 7/02; B60B 7/04; B60B 7/06; B60B 7/061; B60B 7/063; B60B 7/066; B60B 7/08; B60B 7/10; B60B 7/105; B60B 7/12

USPC ............. 301/37.101, 37.102, 37.31, 37.32, 301/37.33, 37.34, 37.12, 37.103, 37.104

See application file for complete search history.

(56) References Cited

U.S. PATENT DOCUMENTS

| | | | | |
|---|---|---|---|---|
| 3,671,076 A * | 6/1972 | Aske | ........................ | B60B 7/02 301/37.42 |
| 4,761,040 A * | 8/1988 | Johnson | ................... | B60B 7/14 301/108.4 |
| 4,762,374 A * | 8/1988 | Brown | ...................... | B60B 7/10 301/108.1 |
| 4,822,109 A * | 4/1989 | Feria | ......................... | B60B 7/12 301/37.31 |
| 5,316,376 A * | 5/1994 | Defreitas | .............. | G09F 21/045 301/37.25 |
| 6,059,375 A * | 5/2000 | Shryock | .................... | B60B 7/10 301/37.109 |
| 6,663,188 B2 * | 12/2003 | Sumi | ......................... | B60B 7/12 301/37.32 |
| 6,676,224 B2 * | 1/2004 | Kogure | ..................... | B60B 7/00 301/37.24 |
| 6,726,290 B1 * | 4/2004 | Yue | ............................ | B60B 7/12 301/37.106 |
| 6,820,475 B2 * | 11/2004 | Wallach | ................... | B60B 7/006 301/108.1 |
| 2013/0062908 A1 | 3/2013 | Henderson et al. | | |
| 2013/0113235 A1 | 5/2013 | Henderson et al. | | |

* cited by examiner

*Primary Examiner* — John Walters
(74) *Attorney, Agent, or Firm* — Price Heneveld LLP

(57) ABSTRACT

An apparatus includes a wheel cover having a relatively-planar disc shape covering a concavity of a truck wheel rim, and a retainer for holding the wheel cover on the wheel rim. In one form, the retainer includes a hula-hoop-shaped ring that engages a channel in the outer lip of the wheel rim (or engages a channel formed by brackets attached to the outer lip). In another form, the retainer includes a clamp ring retainer attached to the rim's axle portion, and coil springs biasingly retaining the wheel cover to the truck wheel. The wheel cover includes radial ribs each having an outer end that forms a pocket shaped to engage an outer lip on the truck rim, thus holding and centering the wheel cover on the truck wheel. Anti-wear foam components are attached to reduce wear by the wheel cover on the rim.

24 Claims, 14 Drawing Sheets

WHEEL COVER

CROSS-REFERENCE TO RELATED APPLICATION

This application claims benefit under 35 USC §119(e) of provisional application Ser. No. 61/661,034, filed Jun. 18, 2012, entitled AIR TURBULENCE-REDUCING WHEEL COVER, the entire contents of which are incorporated herein by reference.

BACKGROUND

The present invention relates to air-turbulence-reducing wheel covers for semi tractor and trailer wheels, and more particularly relates to a wheel cover that releasably mates with existing truck (and trailer) wheel rims to cover their air-turbulence-creating concavity, yet that is easy to attach, durable, low cost, and aesthetically pleasing.

Truck wheel rims are different from car wheel rims, since they are far more heavy duty, often beat up during extended use, and include eight or more attachment nuts spaced around a deep-dished axle hub. It is noted that semi tractor and trailer wheels (sometimes herein called "truck wheels") have traditionally not included any wheel cover at all, because of their spartan design, a desire of truck owners to minimize cost, and rugged abuse while in service that would lead to a constant need to replace them.

SUMMARY OF THE PRESENT INVENTION

In one aspect of the present invention, an apparatus is provided for attachment to an outboard side of an existing truck wheel, rim, or axle to reduce air turbulence around the truck wheel. The apparatus comprises a wheel cover having a relatively planar disc shape adapted to cover a concavity on a truck wheel, and a retainer adapted for securing the wheel cover to the truck wheel.

In a narrower form, the retainer includes a hoop-shaped frictionally-retained retainer that engages a channel in the rim.

In a narrower form, the apparatus includes a component that reduces or eliminates wear caused by relative movement of the cover to the rim during vehicle operation when the wheel is rotating.

In a narrower form, the coils springs include a bent end with a reverse tip, the bent end being configured to fit through a receiver slot on the wheel cover and, when rotated, the reverse tip being configured to engage a receiver hole spaced from the receiver slot.

In a narrower form, the wheel cover includes a plurality of radial ribs having an outer end that extends from an inner surface of the wheel cover to form a pocket, shaped to engage an outer lip on the truck rim with the wheel cover covering a recess formed by the rim around the axle.

In another aspect of the present invention, an apparatus comprises a wheel cover having a relatively planar disc shape sufficiently large to cover a concavity of a truck wheel rim, and a retainer system for holding the wheel cover on the truck wheel rim.

In yet another aspect of the present invention, a method for reducing fuel consumption in heavy duty transport tractors and trailers, comprises providing a wheel cover having a relatively planar disc shape configured to cover portions of a truck rim, providing a retainer adapted for attaching the wheel cover to the truck rim, and attaching the wheel cover to the truck wheel rim using the retainer.

In still another aspect of the present invention, a method for reducing fuel consumption in heavy duty transport tractors and trailers comprises attaching a wheel cover having a relatively planar disc shape to a truck wheel rim, with the wheel cover covering a concave portion of the truck wheel rim to reduce wind resistance during high speed travel.

These and other aspects, objects, and features of the present invention will be understood and appreciated by those skilled in the art upon studying the following specification, claims, and appended drawings.

BRIEF DESCRIPTION OF DRAWINGS

FIG. 14 is a fragmentary side view of a modified wheel cover similar to that shown in FIGS. 1-3.

DETAILED DESCRIPTION OF PREFERRED EMBODIMENTS

Figure 1:
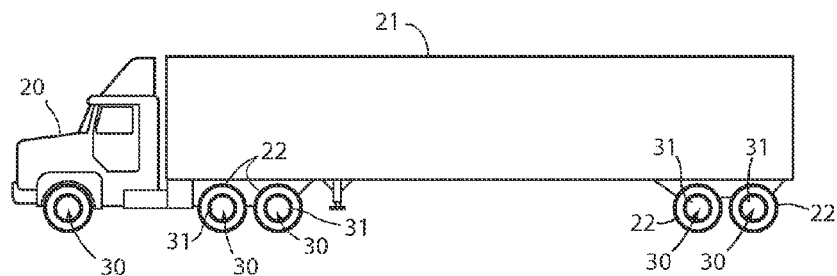
FIG. 1 is a side view of a semi tractor and trailer having heavy duty truck wheels and wheel covers attached thereto.
Figure 2:
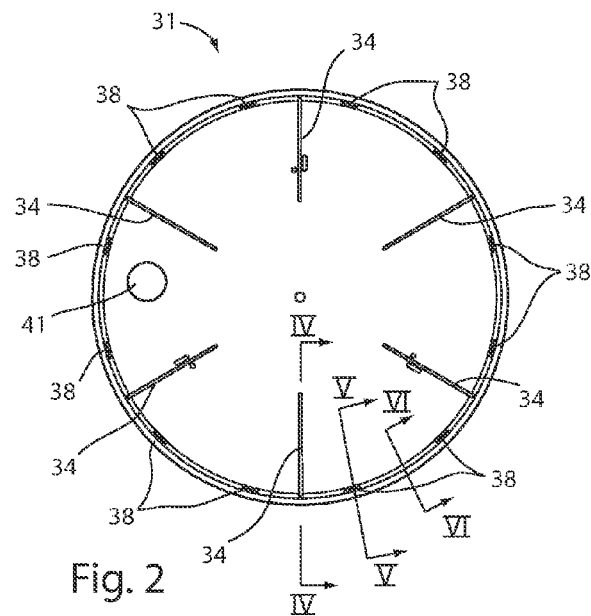
FIGS. 2-3 are planar and edge views of the wheel cover of FIG. 1.
Figure 3:
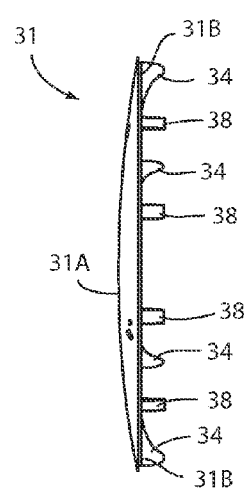
Figure 4:
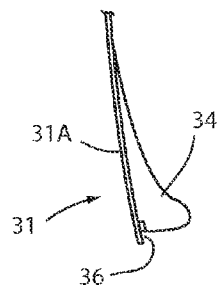
FIGS. 4-6 are cross sections taken along lines IV, V and VI in FIG. 2.
Figure 5:
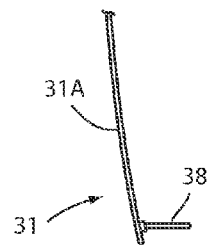
Figure 7:
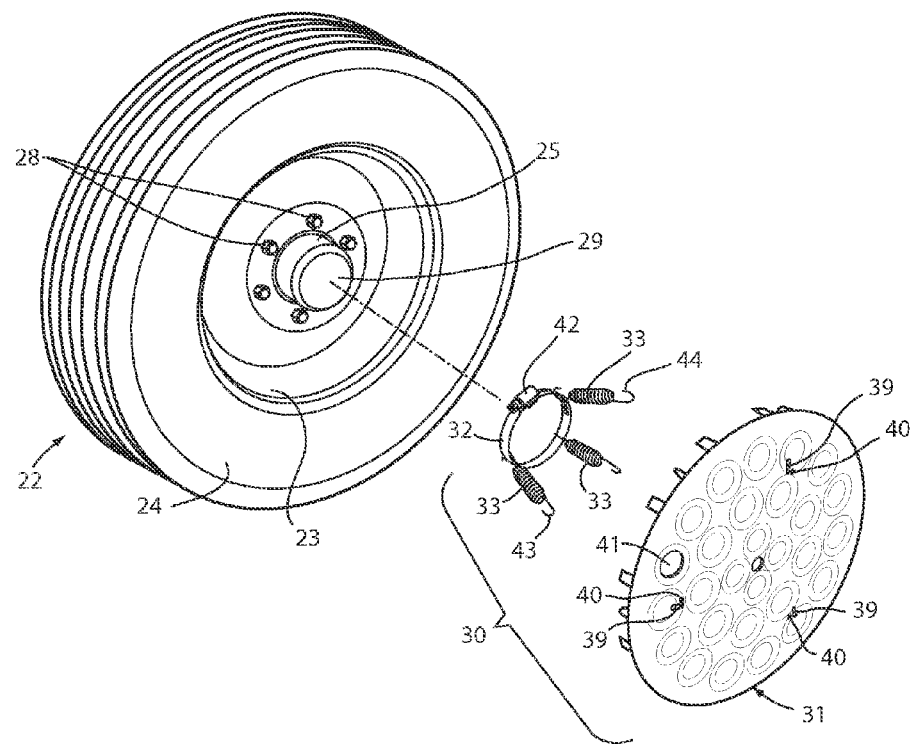
FIGS. 7-8 are an exploded and fragmentary-exploded views of a truck wheel and wheel cover from FIGS. 1-2.

The present apparatus 30 (FIG. 1) (also called an "air-turbulence-reducing wheel covering system" herein) includes wheel covers 31 adapted to cover an outer concavity of existing wheels 22 of most truck tractors 20 and trailers 21. It does so in a manner greatly reducing wind turbulence and resistance during high speed, thus improving gas mileage. Notably, the present apparatus 30 can be used on new or used vehicles. It has been found to be particularly useful for existing tractors 20 and trailers 21 having (existing or new) heavy duty deep dish truck wheels 22, where the wheels 22 (FIG. 7) include a concave rim 23 and a tire 24. Specifically, most existing rims 23 include an axle-fitting portion 25 and a tire-receiving outer lip 26 (FIG. 8), and define a concavity 27 therebetween where multiple bolts/nuts 28 secure the rim 23 to a hub on a truck's axle 29. The present wheel covers 31 cover the concavity 27, and are relatively flat such that they provide low wind resistance, thus greatly reducing wind turbulence and resistance during high speed transport. Specifically, the present apparatus 30 has been tested to save up to 2-4 percent of fuel consumption by the truck tractor 20, and more specifically about 2.33 percent to 2.44 percent, depending of course on road conditions, environment, and truck speed.

Specifically, the illustrated apparatus 30 (FIG. 7) includes an aesthetically surfaced wheel cover 31 having a slightly-outwardly-bowed, relatively-planar disc shape large enough to cover the concavity of the truck wheel rim 23. The bowed shape of the cover 31 includes multiple shallow depressions that give improved strength, good wind slip-by (i.e. minimal wind resistance), and great aesthetics. A clamp ring retainer 32 is attached around the axle portion 25 of the rim 23. Three coil springs 33 (or more, such as possibly six, depending on the retaining strength required by a particular application) are attached between the wheel cover 31 and clamp ring retainer 32 at equally-spaced-apart locations to bias the wheel cover 31 toward the truck wheel rim 23.

Figure 6:
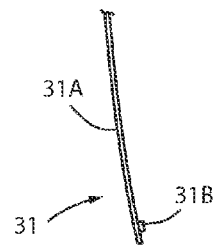
Figures 9, 10:
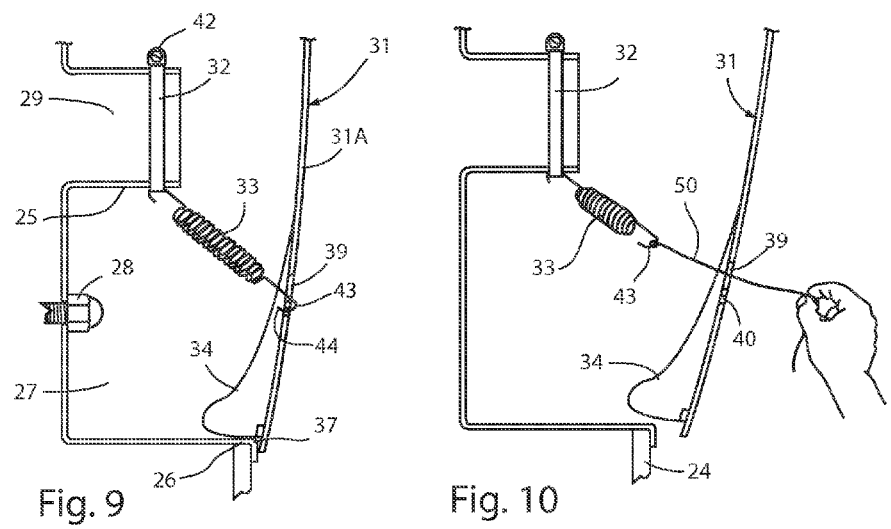
FIG. 9 is a fragmentary cross sectional view showing attachment of the wheel cover of FIG. 2 to a truck wheel/axle.
FIGS. 10-14 are cross sectional views showing a method of attachment for the wheel cover of FIGS. 8-9.
Figure 11:
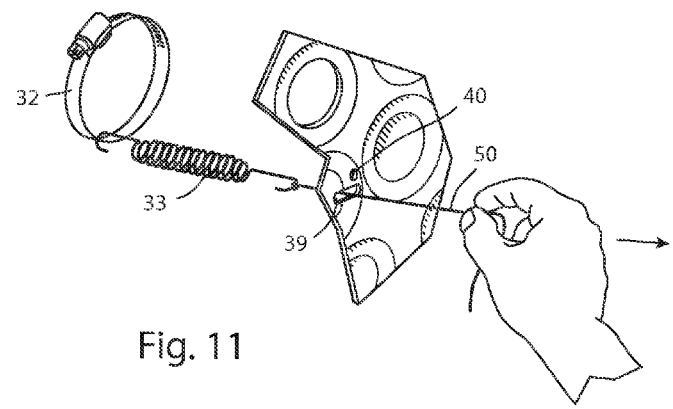
Figures 12, 13:
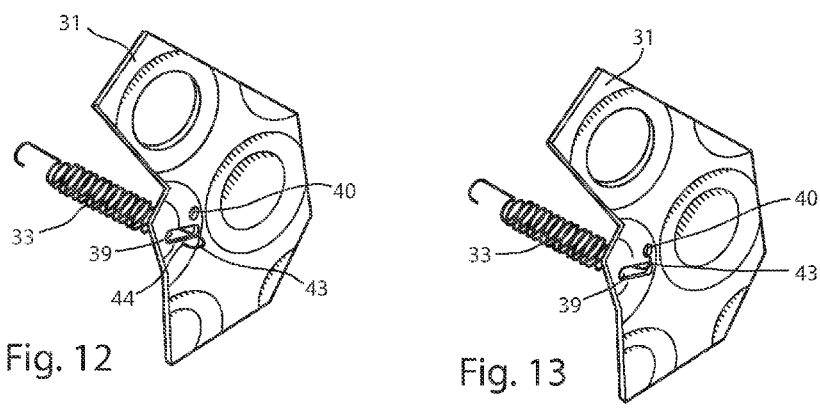
Figure 14:
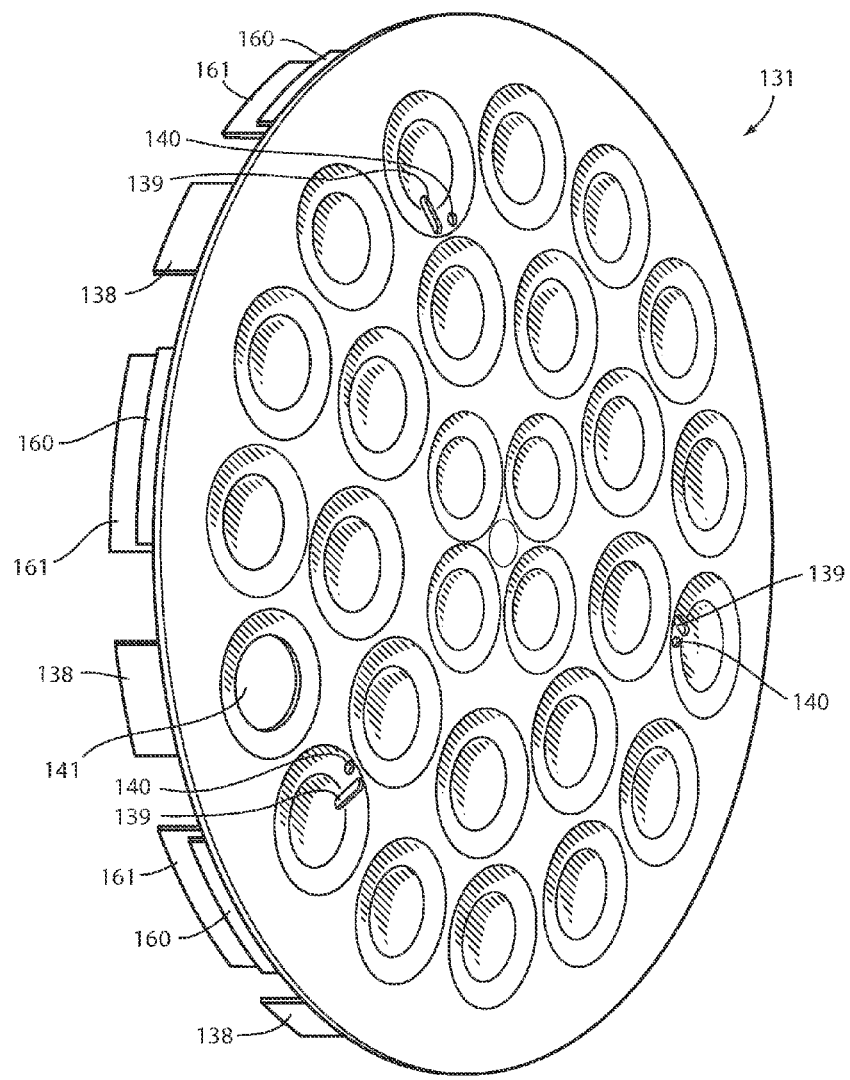
Figure 15:
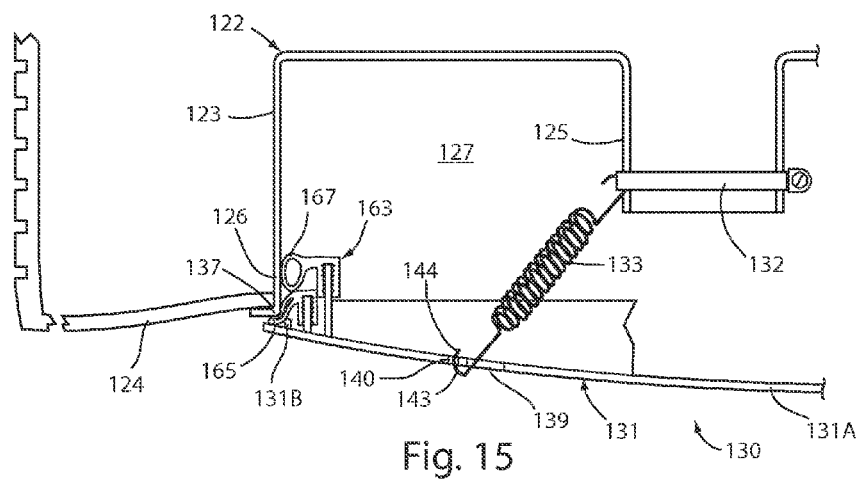
FIG. 15 is a fragmentary side view of the modified wheel cover of FIG. 14 attached to a truck wheel and axle.
Figure 16:
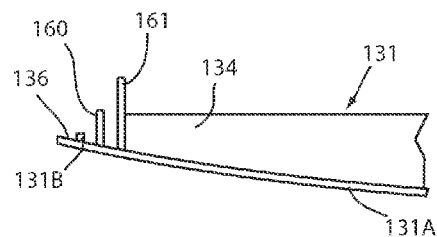
FIGS. 16-18 are fragmentary side cross sectional views of the wheel cover, the wheel cover including its anti-wear components (exploded) and the wheel cover with anti-wear components (assembled).

The wheel cover 31 can be any size desired, but an optimal size for most rims 23 is slightly larger than about 24½ inches diameter for 24½ inch rims, or slightly larger than about 22½ inches diameter for 22½ inch rims. The wheel cover 31 is made of recycled polymeric plastic (PP), such as glass fiber reinforced polypropylene, such as 10 percent to 20 percent glass filled PP. A sheet-like body 31A of the wheel cover 31 is relatively flat, slightly outwardly bowed (such as about ½ inch), and as illustrated, includes a plurality of shallow 1-2 inches diameter shallow depressions of about ⅛ inch depth for aesthetics and optimal wind slip-by and for strength. The inner surface of the wheel cover 31 (FIG. 2) includes a plurality of radially extending stiffening ribs 34, such as six ribs angularly spaced apart. The ribs 34 have an increased height at their outer end (FIG. 4), with an outer end forming a pocket 36 shaped to engage an outer inside tip 37 (FIG. 9) on the truck rim 23. Tabs 38 spaced from the ribs 34 are located near the ribs 34 and form pockets adjacent the pockets 36. The illustrated tabs 38 are about 1 inch high, ¾ inch wide, and about ⅛ inch thick, with their width extending in a circumferential direction so that they help register and hold the wheel cover 31 in the tip 37 of the lip 26. The ribs 34 and tabs 38 register against the rims 23 to locate the wheel cover 31 centrally on the truck wheel 22 (FIGS. 2-5). Slots 39 are formed through the wheel cover 31 for receiving an end of the springs 33. Holes 40 are located adjacent the slots 39 but on an opposite side of an adjacent rib 34 (which provides greater structure on the wheel cover 31 and hence improved non-creeping retention strength for holding a stretched spring 33 as discussed below). As described below, the end of the spring 33 is slipped through one of the slots 39, and then rotated 90 degrees so that the tip of the spring 33 is positioned in the hole 40 (and across the rib 34). A hole 41 (FIG. 2) is provided in the wheel cover 31 for accessing an air valve for inputting compressed air into the tire 24. A perimeter ridge 31B (FIG. 6) extends around the body 31A for added strength and stiffness, and to further support the ribs 34 and to facilitate injection molding of the wheel cover 31.

The clamp ring retainer 32 (FIG. 7) (e.g. long hose clamp) is a band of steel long enough to wrap around and clamp onto the axle portion 25, such as about 6 inches-9 inches diameter. The band 32 includes a plurality of parallel angled slits near one end, and includes a screw tightener 42 on the other end that is adapted to walk up the angled slits as the screw is rotated to tighten the clamp ring retainer 32 on the axle portion 25. The band 32 is preferably treated for rust resistance and/or is made of a resistant material such as stainless steel.

Figure 8:
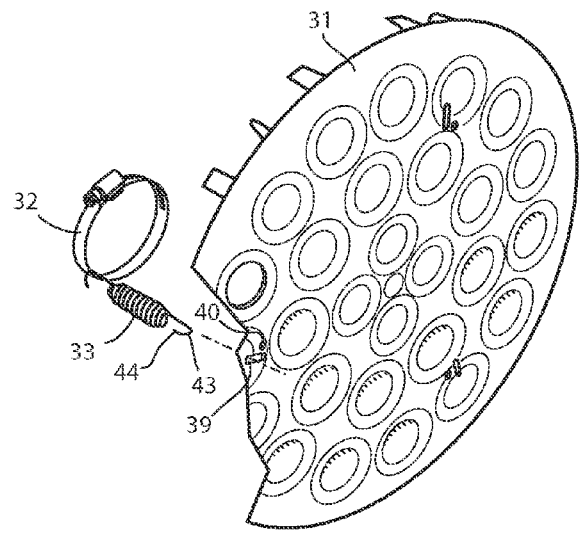

The springs 33 include a hook-forming end (also called "loop end") attached to the metal band of the clamp ring retainer 32. The opposite end of the springs 33 comprise a hook-forming bent end 43 with a reverse tip 44 (FIG. 8). The bent end 43 is configured to fit through one of the receiver slots 39. When pulled through, the bent end 43 can be rotated so that the reverse tip 44 fits into the adjacent receiver hole 40 for secure retention. By this arrangement, the springs 33 securely bias the wheel cover 31 against the rim 23. The springs 33 are preferably treated for rust resistance and/or are made of a resistant material, such as stainless steel. The springs 33 preferably are about 4¾ inches in unstretched length, and each provide a spring tension force of about 7-14 pounds pressure when in an assembled tensioned state, i.e. stretched to a service distance of about 5½ inches to 8½ inches.

We have tested the wheel cover system 30 with significant success. Prototype wheel covers 131 have reduced fuel consumption by as much as 2-3 percent, and more specifically in our testing reduced it about 2.33 percent to 2.44 percent on an 18 wheeler. This is considered to be a surprising and unexpected result.

Second Embodiment

A modified apparatus 130 is illustrated in FIGS. 14-22. Components, features, and characteristics of apparatus 130 are identified by the same numbers as in apparatus 30, but with the identifying number being a "100" number. This is done to reduce redundant discussion. All information from apparatus 30 applies to apparatus 130 unless specifically stated otherwise.

FIGS. 14-22 disclose a wheel cover system 130 including a modified wheel cover 131 for covering existing wheels 122 (FIG. 14, 19-22) of tractors 120 and trailers 121 (see FIG. 1), where the wheels 122 (FIG. 15) include a concave rim 123 and a tire 124, the rim 123 including an axle-fitting portion 125 and a tire-receiving outer lip 126 with a concavity 127 therebetween. The illustrated apparatus 130 (FIGS. 14-22) includes the aesthetically surfaced wheel cover 131 having a slightly-outwardly-bowed, relatively-planar disc shape, a clamp ring retainer 132, multiple coil springs 133 for retaining the wheel cover 131 and to the clamp ring retainer 132.

The wheel cover 131 is made of (virgin or recycled) polymeric material, such as glass fiber reinforced polypropylene, such as 10 percent to 20 percent glass filled PP as discussed above. The wheel cover 131 includes a sheet-like body 131A that is relatively flat, slightly outwardly bowed (such as about 1 inch-2 inches), and as illustrated includes a plurality of shallow 1 inch-2 inches diameter shallow depressions of about inch depth. The inner surface of the wheel cover 131 (FIG. 22) includes a plurality of radially extending stiffening ribs 134, such as six ribs, that form with the outer end a pocket 136 shaped to engage an outer inside tip 137 (FIG. 15) on the truck rim 123. Tabs 138 (FIG. 22) spaced from the ribs 134 are located near the ribs 134, and are similar in shape and size to tabs 38. The ribs 134 and tabs 138 (FIG. 15) register against the rims 123 to locate the wheel cover 131. Slots 139 and holes 140 are located in the cover 131 for receiving an end of the spring 133. The spring(s) 133 are attached as previously described to hold the cover 131 on the truck wheel. A hole 141 provides access to an air valve in the truck tire. A perimeter ridge 131B extends around the body 131A for strength and stiffness. The clamp ring retainer 132 (FIG. 15) is similar to retainer 32 previously described.

The springs 133 (FIG. 15) are also similar to the springs 33 previously described, and include a bent end 143 with a reverse tip 144 configured to fit through the receiver slots 139 and then engage the adjacent hole 140. When installed, the springs 133 securely bias the wheel cover 131 against the rim 123.

Figure 17:
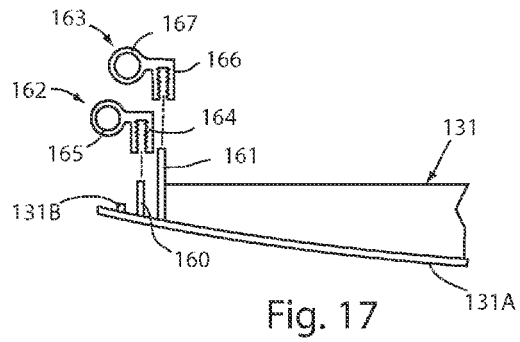
Figure 18:
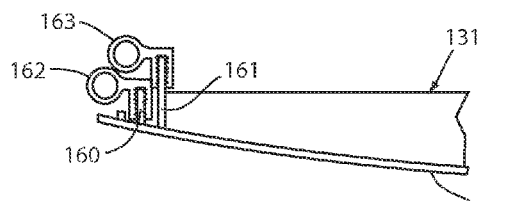
Figure 19:
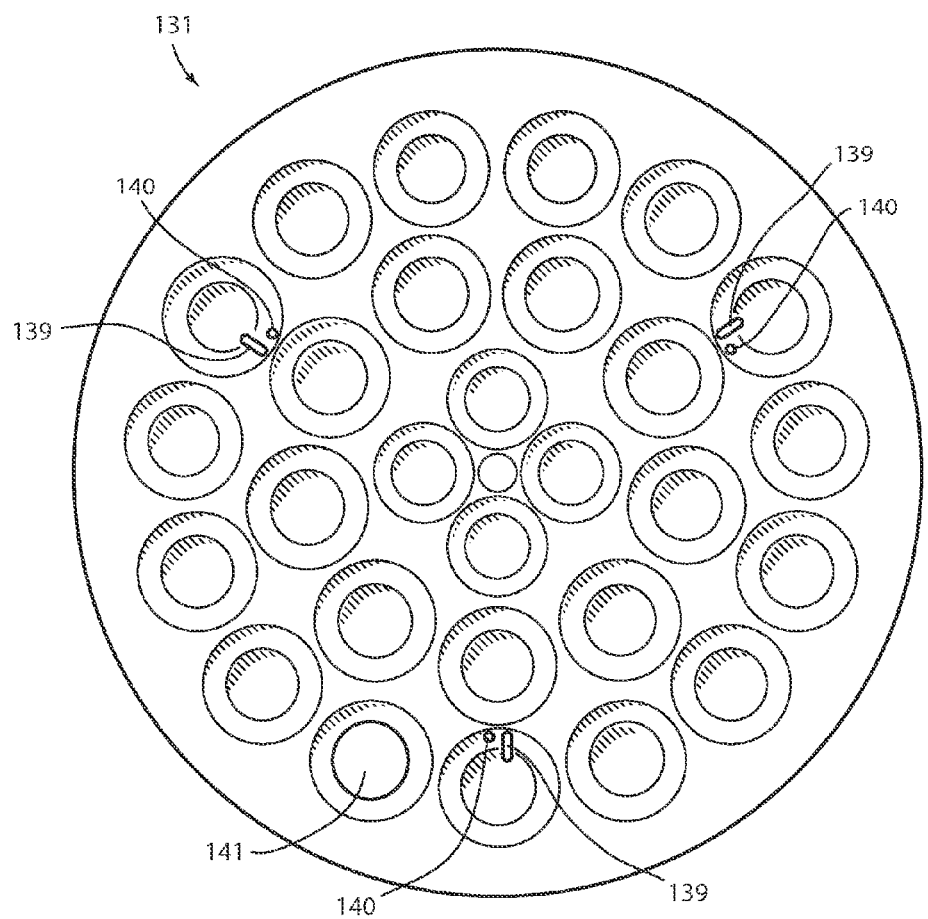
FIGS. 19-22 are front (face), side edge, rear perspective, and rear (inside) views of the modified wheel cover of FIG. 15.
Figure 20:
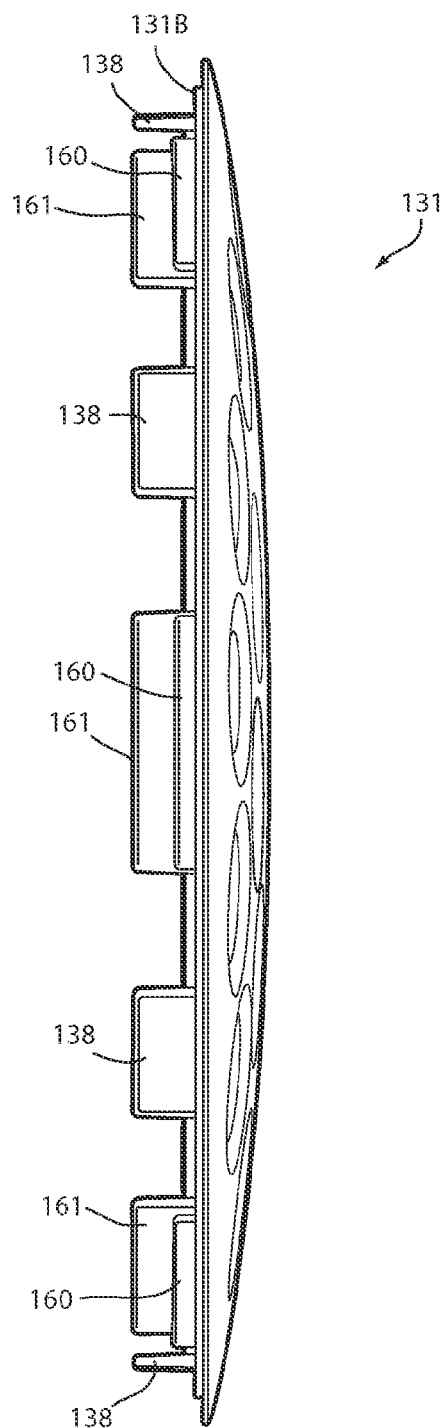
Figure 21:
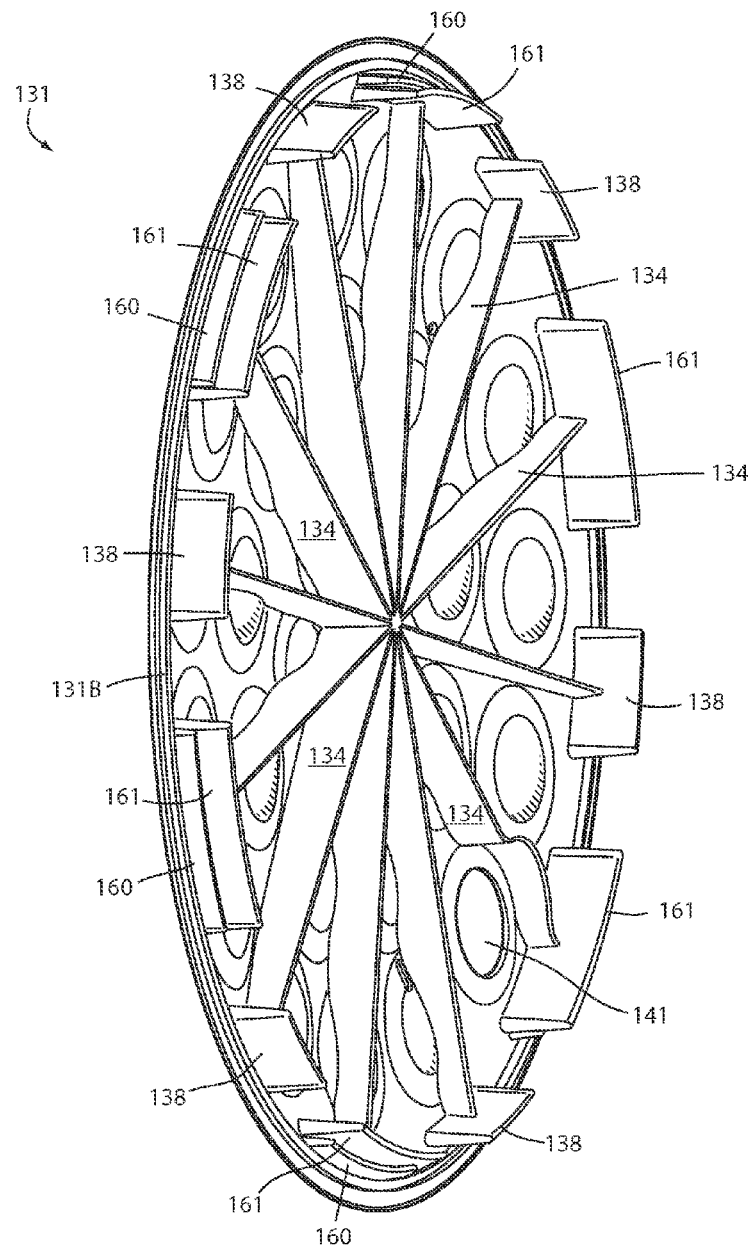
Figure 22:
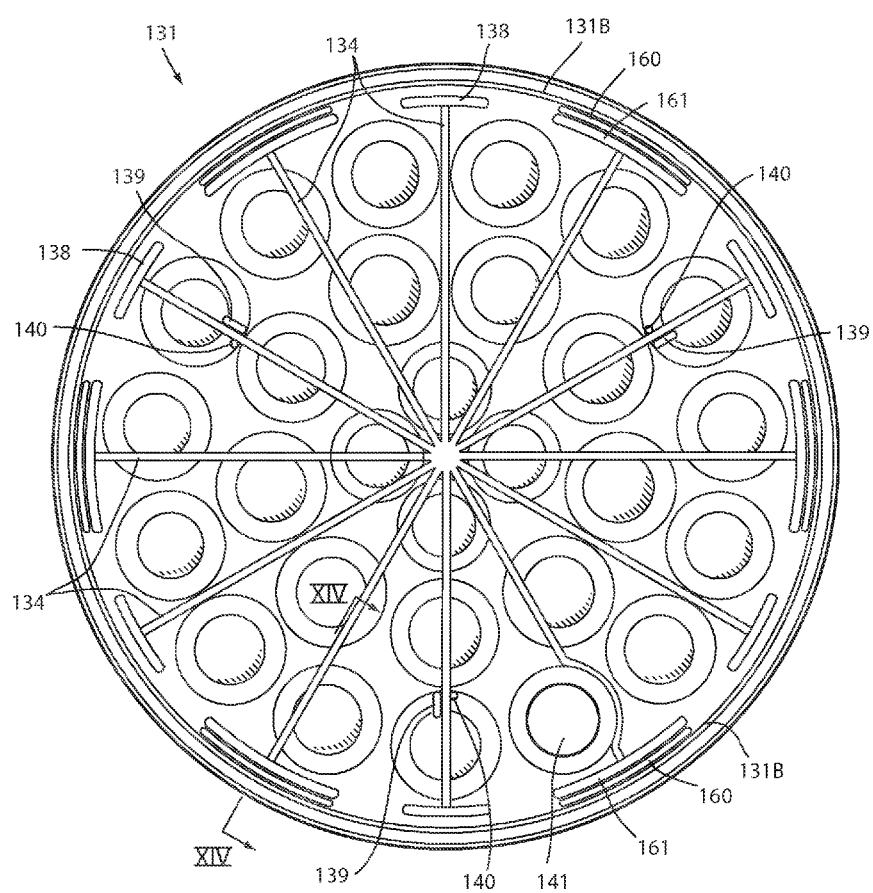

As can be seen by studying FIGS. 14-22, the modified wheel covers 131 include a pair of parallel arcuate mounting ribs 160 and 161 extending circumferentially about ⅓ of a distance between the outer end of each radially-extending reinforcement rib 134. The mounting ribs 160 and 161 are centered between adjacent ribs 134, and are spaced inward from the perimeter ridge 131B. The outermost mounting rib 160 is equal to or slightly shorter in height than the innermost mounting rib 161 (FIG. 17). The mounting ribs 160 and 161 support foam anti-wear components 162 and 163, respectively (FIGS. 17-18). Specifically, the component 162 includes a U-shaped solid plastic retainer end 164 (potentially reinforced by internal metal U-shaped reinforcers), with the end 164 frictionally engaging a top end of the mounting rib 160. A resilient foam tube section 165 extends laterally from the retainer end 164 (FIGS. 17-18). Similarly, the component 163 includes a U-shaped solid plastic retainer end 166 that frictionally engages the top end of the mounting rib 161, with a tube section 167 (preferably of foam or potentially of another soft resilient material or rubber) extending laterally from the retainer end 166. The illustrated tube sections 165 and 167 are shown as hollow and circular, but it is contemplated that one or both of the tube sections could be filled if desired, or that the tube sections 165 and/or 167 could define a different cross sectional shape.

When assembled (see FIG. 15), the foam tube section 165 is compressed between the perimeter of the cover 131 and the tip 137 of the rim 123. When assembled, the foam tube section 167 is compressed (to a lesser extent) against/between the cover 131 and the rim 123. By this arrangement, the foam section 165 separates the cover 131 from the rim 123 and prevents/reduces chafing and wear, with the foam section 167 dampening relative movement. It is contemplated that the anti-wear components 162 and 163 could potentially be designed as a single unitary part, and potentially could be designed as an integral part of the cover 131. Notably, the components 162-163 terminate short of the radially-extending ribs 134 so that they form a notch or opening for moisture and debris to exit the concavity 127.

Additional Embodiments

A modified version of the present truck-wheel-covering system for improved aerodynamics includes a wheel cover 131A (FIG. 23) that is like the wheel cover 131 in FIGS. 10-22, but in the wheel cover 131A (FIG. 23), the slots 139 and holes 140 and springs 33 are eliminated. Instead, a hula-hoop-like tubular hoop retainer 200 (FIG. 23-24) is used to nest into and frictionally engage an inward-facing channel 201 on the outer lip 126 (sometimes called a "tip" or "bead") of the wheel rim 123 to secure the wheel cover 131A in place on the wheel 122. The hoop retainer 200 is made slightly oversized (by about ¼ inch in length) so that it longitudinally compresses and friction-fits into the channel 201 during installation (much like a Ziploc® closure device as it engages in a closable sandwich bag). When installed, the foam components 162/163 (which are resilient sponge rubber with steel core in dual durometer rubber segments) are compressed against the rim to thus satisfy their anti-wear function. It is noted that one method to cut the tube is to position the tube in a channel 201 on the truck wheel rim 123, and cut it to a length that is ¼ longer than the circumference of the channel 201. Then, a connector 202 is friction-fit into the ends of the cut tube, securing the ends together to form a continuous loop. The connector 202 can be many different things such as a short stud or the like. One union connector 202 that is particularly effective is to cut a 2" segment from a second tube having an OD that fits into and frictionally engages the ID of the tube forming the hoop retainer 200, such that the abutting ends of the tube forming the hoop retainer 200 engage when the hoop retainer is friction fit into the channel 201. This causes hoop retainer 200 to compress longitudinally, resulting in significant outward radial pressure that secures the retainer 200 (and wheel cover 131A) in position on the wheel rim 123.

It is contemplated that various materials can be used for hoop retainer 200. One material that has successfully been used for the hula-hoop-shaped retainer 200 (FIG. 23) is a semi-stiff tube of HDPE (hi density polyethylene) material, about ½" OD, that engages the channel 201 in the outer lip 126 of the wheel rim 122 to hold the wheel cover 131 in position. The tube is similar to or slightly softer than a tubular material often referred to as PEX tubing, which is a commercially available tubing often used in conveying hot water underground and through/under buildings. The installation to truck wheel 122 is shown in FIG. 24.

Figure 24:
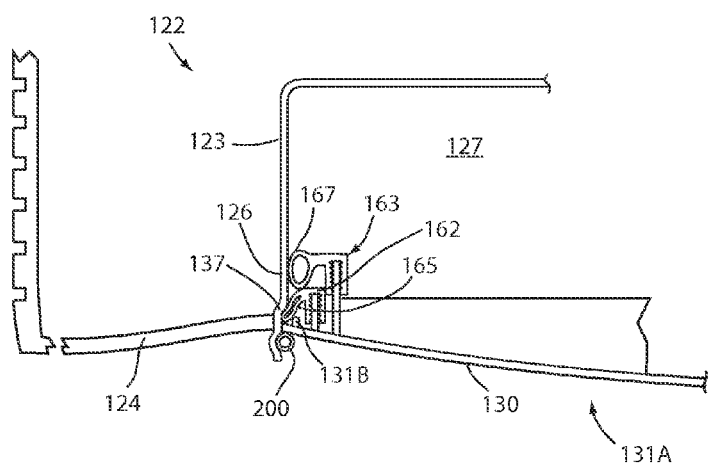
FIG. 24 is an enlarged fragmentary view of the structure around the wheel-rim-defined channel, the hoop retainer, and the anti-wear foam components.
Figure 25:
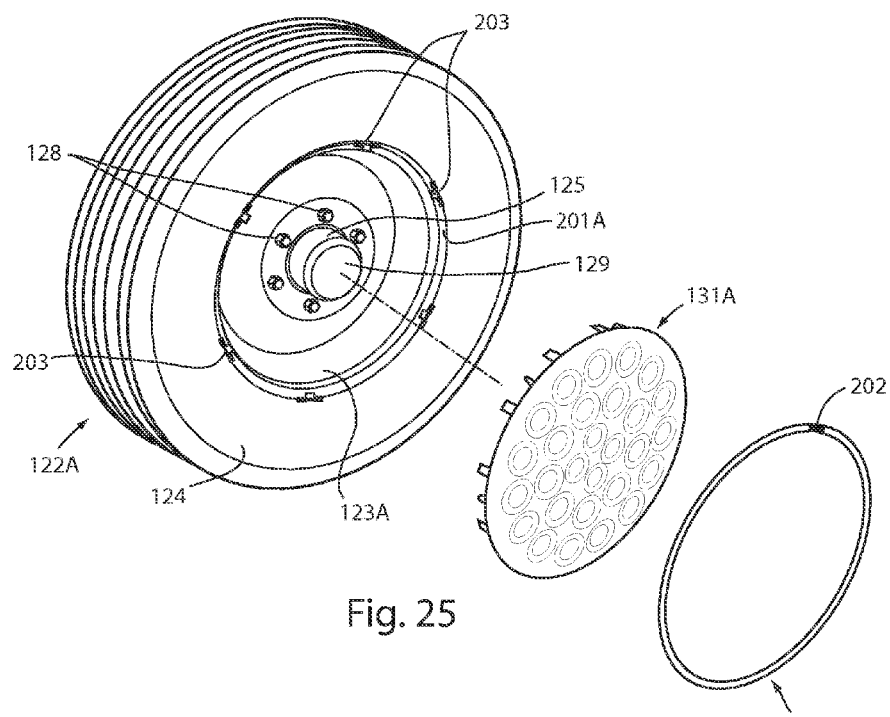
FIGS. 25-26 are similar views to FIGS. 23-24, and show another modified version like that of FIGS. 23-24, but where brackets are used to form a channel on the wheel rim for engaging the hoop retainer.
Figure 26:
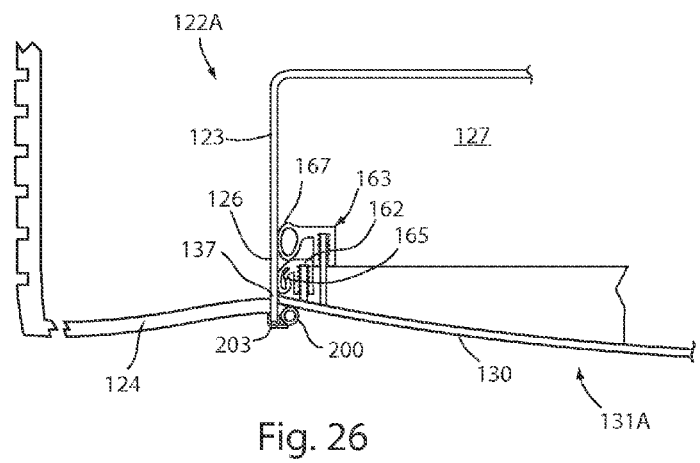
Figure 27:
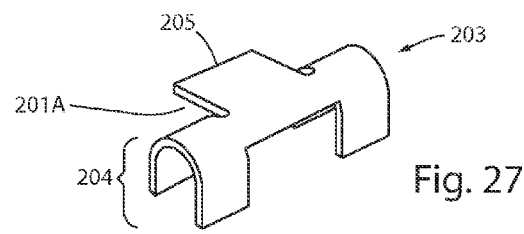
FIG. 27 is an enlarged fragmentary view of the rim-attached bracket in FIGS. 25-26.

Some truck wheels 122A (FIGS. 25-26) have rims 123A that do not define a channel (201). FIGS. 25-26 are similar views to FIGS. 23-24, and show another modified version like that of FIGS. 23-24, where equally-spaced-apart finger brackets 203 (such as six or more) are attached to the wheel rim 122A to form the equivalent of a channel 201A on the wheel rim 122A for engaging the hoop retainer 200. The brackets 203 have a C-shaped portion 204 that grips the rim 123A much like lead wheel weights used to balance centrifugal forces of a spinning wheel. The brackets 203 further have a finger 205 that extends in an inward direction (generally perpendicular to and inward from the inboard surface of the rim 122A). The fingers 205 combine to define a channel 201A for receiving and frictionally engaging the hoop retainer 200. FIG. 27 is an enlarged fragmentary view of the rim-attached bracket in FIGS. 25-26. It is contemplated that a length of the fingers 205 can be made short enough to allow the brackets 203 to be installed on a wheel rim 123A prior to positioning the wheel cover 131A against the wheel 122A.

Figure 23:
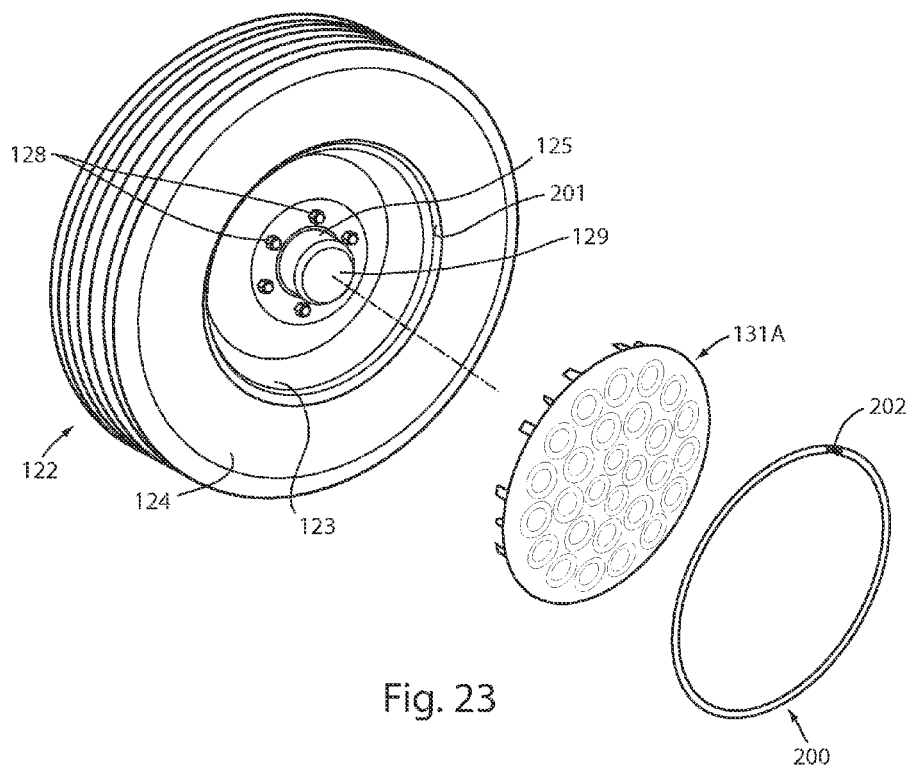
FIG. 23 is an exploded perspective view of another modified version, where a hula-hoop-shaped retainer engages a channel in the outer lip of the wheel rim to hold the wheel cover in position.
Figure 28:
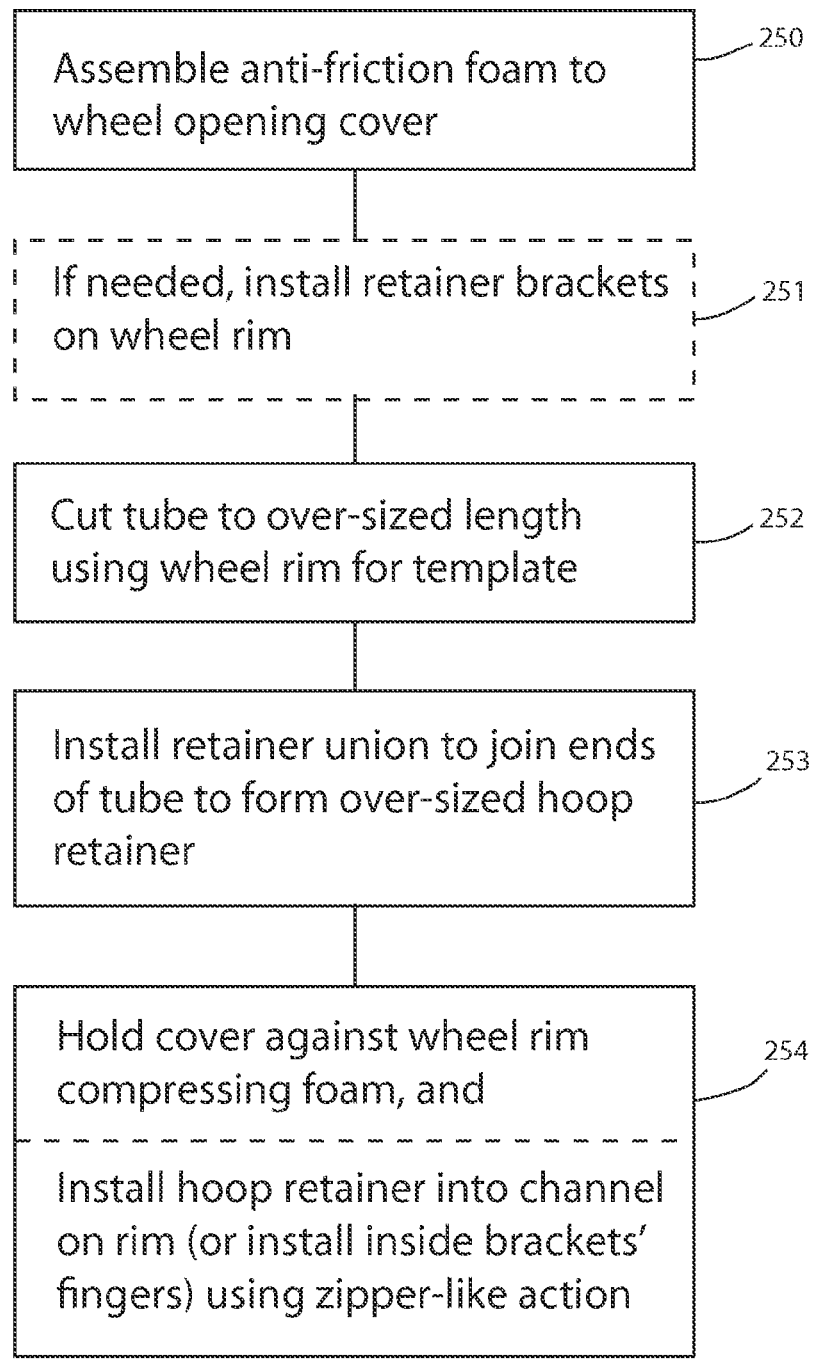
FIG. 28 is a flow chart showing a method of installation using the apparatus of FIGS. 23 and 25.

FIG. 28 is a flow chart showing a method of installation using the apparatus of FIGS. 23 and 25. As noted in box 250, the wheel cover 131 is first assembled (including attaching the foam components 162, 163). If necessary (box 251), the brackets 203 are attached to the wheel rim 122A. In box 252, the tube for forming the hoop retainer 200 is then positioned against the rim 122 in the channel 201 (or channel 201A) and cut to a length that is about ¼ inch greater than the circumference of the channel 201 (or 201A). In box 253, the union connector 202 is attached to permanently form the hoop retainer 200. Then, in box 254 while holding the wheel cover 131 against the rim 122 (compressing the foam components 162, 163), the hoop retainer 200 is forced into the channel 201 with a zip-lock zipper-like action. Due to a longitudinal compressive force generated by the forced engagement, the retainer 200 securely engages the channel 201 and thus holds the wheel cover 131 with considerable force against accidental release.

Figure 29:
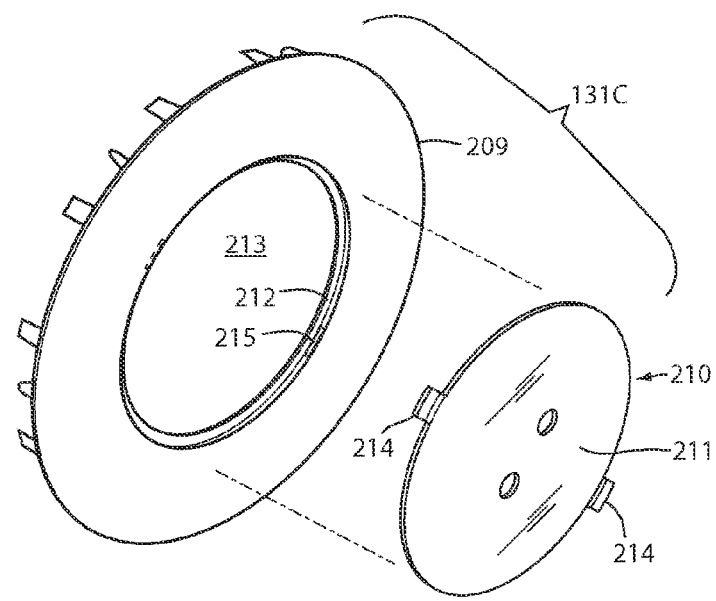
FIG. 29 is an exploded perspective view of a wheel cover including a fastenerless-attached center plate.
Figure 30:
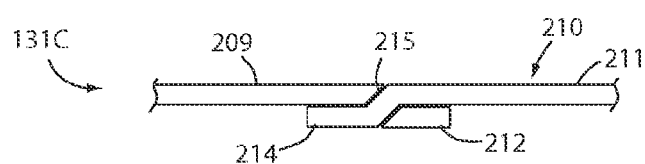
FIGS. 30-32 are cross sections showing alternative tab-slot fastenerless attachment systems for attaching the center plate to the aperture wheel cover.
Figure 31:
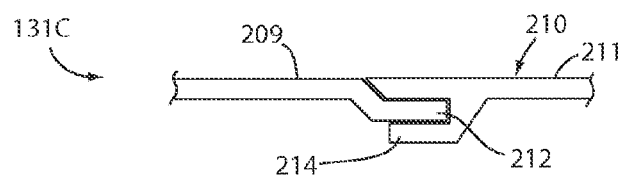
Figure 32:
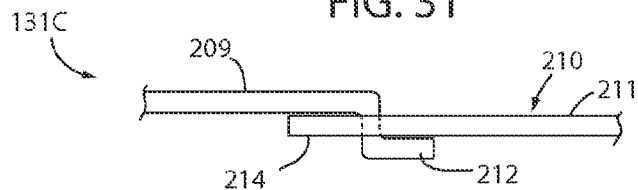
Figure 33:
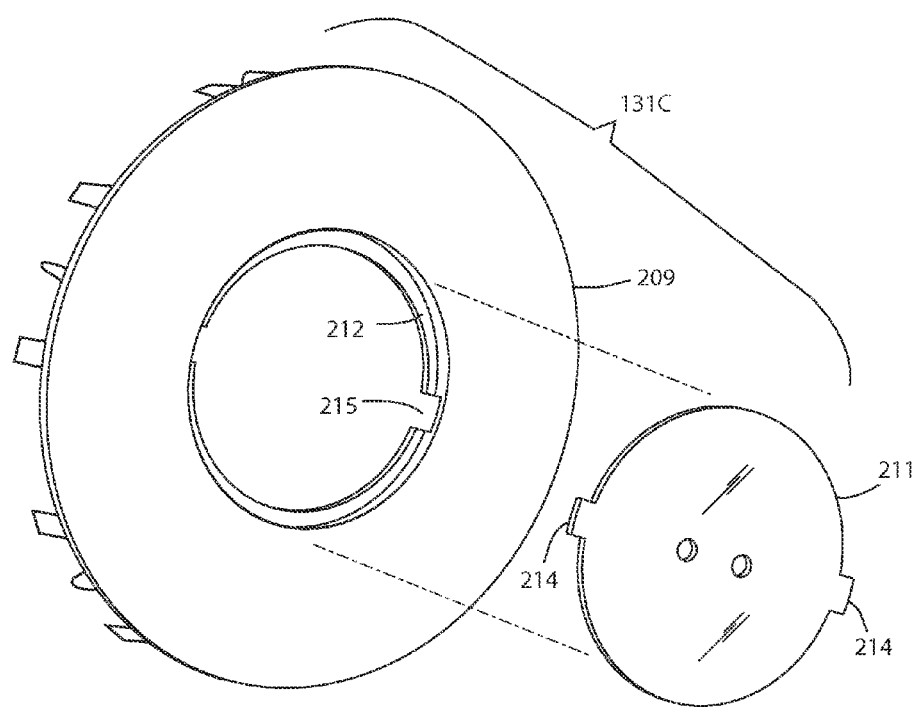
FIG. 33 is an exploded perspective view showing another attachment system where a center plate has opposing tabs that, when the center plate is bowed, fit into mating slots in the aperture wheel cover.

Some truckers and users of the present innovative apparatus desire greater aesthetics. FIG. 29 is an exploded perspective view of a wheel cover 131C including a fastenerless-attached center panel 210 attached to a center of an aperture wheel cover body 209. The body 209 is substantially like the wheel cover 131A except it has a large center hole 213 defined by a recessed annular flange 212. The center panel 210 advantageously can be separately treated for aesthetics, thus greatly reducing overall cost of treating an entire wheel cover 300. The illustrated center panel 210 includes a flat body 211 with perimeter that matably fits into a recessed flange 212 forming the opening 213 in the wheel cover body 209. Tabs 214 extend in opposing directions, and are configured to engage slots in mating recessed surfaces 215 on the wheel cover body 209. The illustrated tabs 214 can be offset below a plane of the body 211 (FIG. 30), or can be formed on a bottom of the perimeter to create a pocket for engaging the flange 212 (FIG. 31), or can be co-planar with the body 211 (FIG. 32). Alternatively, notches 215 can be cut into the flange 212 (FIG. 32). In FIG. 32, the flat body 211 is resilient and can be flexed or bowed to a non-planar condition so that the opposing tabs 214 define a dimension sufficiently small to allow the tabs 214 to be fit into the opposing notches 215. Notably, the center panel 210 of FIGS. 32-33 has a simple flat shape such that it is easily manufactured at low cost, and further it has an outer surface that is easily treated for aesthetics. Further, the center panel 210 can be made of a material optimally suited for the surface treatment selected. For example, the center panel 210 can be plastic (such as ABS, or acrylic, or polycarbonate, or nylon) or can be metal or composite or other material. Thus, the center panel 210 can be treated, colored/painted, plated (including potentially chromed), surface-textured, or otherwise made to have any desired appearance and/or logo. Further, the center panel 210 can be stamped, molded, or otherwise formed.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An apparatus for attachment to an outboard side of an existing truck wheel, rim, or axle, to reduce air turbulence around the truck wheel, the apparatus comprising:
   a wheel cover having a relatively planar disc shape adapted to cover a concavity on an outboard side of the truck wheel; and
   a retainer system including first retainers attached to an outer tip of the wheel rim, and at least one second retainer engaging the first retainers and the wheel cover to thus secure the wheel cover to the outboard side of the truck wheel.

2. The apparatus defined in claim 1, wherein the at least one second retainer includes a hoop-shaped retainer that is constructed to frictionally engage a rim of the truck wheel.

3. The apparatus defined in claim 2, wherein the retainer system defines a channel inside the outer tip of inside the outer tip of the rim, and wherein the at least one second retainer engages the channel to retain the wheel cover against the truck wheel.

4. The apparatus defined in claim 2, wherein the first retainers include brackets attached to the rim that define a channel, and wherein the second retainer comprises a hoop that engages the channel to retain the wheel cover against the truck wheel.

5. The apparatus defined in claim 1, including at least one anti-wear component positioned between the wheel cover and wheel rim that reduces or eliminates wear caused by relative movement of the wheel cover to the wheel rim during vehicle operation when the wheel rim is rotating.

6. The apparatus defined in claim 5, wherein the component includes a resilient foam material.

7. The apparatus defined in claim 1, wherein the retainer system includes a clamp ring and springs.

8. The apparatus defined in claim 1, wherein the wheel cover includes a plurality of radial ribs having an outer end that extends from an inner surface of the wheel cover to form a pocket shaped to engage an outer lip on the truck rim with the wheel cover covering a recess formed by the rim around the axle.

9. The apparatus defined in claim 1, wherein the retainer includes a plurality of springs extending between the wheel cover and shaped to bias the wheel cover against the truck wheel.

10. The apparatus defined in claim 1, wherein the first retainers include a C-shaped portion frictionally attached to the outer tip of the wheel rim.

11. The apparatus defined in claim 1, wherein the first retainers include inwardly-extending fingers defining a channel adjacent the outer tip of the wheel rim, with the second retainer releaseably engaging the channel.

12. An apparatus for attachment to an outboard side of an existing truck wheel, rim, or axel, to reduce air turbulence around truck wheel, the apparatus comprising:
   a wheel cover having a relatively planar disc shape adapted to cover a concavity on an outboard side of the truck wheel; and
   a retainer system including a retainer for securing the wheel cover to the truck wheel;
   wherein the wheel cover includes an outer ring with center hole defined by an annular flange, and includes an inner center panel with perimeter that engages the annular flange and also includes attachment devices for holding the center panel on the outer ring.

13. The apparatus defined in claim 12, wherein the attachment devices include tabs on one of the outer ring and the center panel that engage mating tab-receiving surfaces on the other of the outer ring and the center panel.

14. An apparatus comprising:
   a polymeric wheel cover having a relatively planar disc shape sufficiently large to cover a concavity of a truck wheel rim; and
   a retainer system for holding the wheel cover on the truck wheel rim including first metal brackets frictionally attached to an outer tip of the wheel rim, and a friction-based metal retainer engaging a channel defined adjacent the outer tip by the first brackets to thus hold the wheel cover on the wheel rim.

15. The apparatus defined in claim 14, wherein the retainer is configured to engage a channel defined at least in part by the wheel rim.

16. The apparatus defined in claim 14, including an anti-wear component on the wheel cover to reduce wear on the wheel rim during operation.

17. The apparatus defined in claim 16, wherein the wheel cover includes a circumferentially extending rib, and the anti-wear component is attached to the rib.

18. The apparatus defined in claim 14, wherein the retainer system includes springs holding the wheel cover against the truck wheel.

19. A method for reducing fuel consumption in heavy duty transport tractors and trailers, comprising:
  providing a wheel cover having a relatively planar disc shape configured to cover concave portions of a truck rim;
  providing first retainers adapted for attachment to an outer tip of an existing truck wheel, rim, or axle;
  providing second retainers for attachment between the first retainers and the wheel cover; and
  assembling the first and second retainers to the truck rim and wheel cover to hold the wheel cover against the truck rim over the concave portions.

20. A method for reducing fuel consumption in heavy duty transport tractors and trailers, comprising:
  attaching a wheel cover having a relatively planar disc shape to a truck wheel rim using first retainers frictionally engaging an outer tip of the wheel rim and using at least one second retainer that frictionally engages the first retainers and the wheel cover to secure the wheel cover in an aerodynamic position covering an outboard-facing concave portion of the truck wheel rim to reduce wind resistance during high speed travel.

21. In a turbulence-reducing apparatus attachable to an outboard side of an existing truck wheel, rim, or axle, to reduce air turbulence around the truck wheel, the apparatus including a wheel cover having a relatively planar disc shape adapted to cover a concavity on an outboard side of the truck wheel, and a wheel-cover-engaging first retainer engaging the wheel cover for holding the wheel cover to the truck wheel, an improvement comprising:
  a plurality of spaced-apart retainers each releasably attached to an outer tip of the wheel rim and having an inwardly-extending finger shaped for releasable engagement by the wheel-cover-engaging first retainer.

22. The apparatus defined in claim 21, wherein the spaced-apart retainers include a C-shaped portion frictionally attached to the outer tip of the wheel rim.

23. The apparatus defined in claim 21, wherein the fingers of the spaced-apart retainers define a channel around and adjacent the outer tip of the wheel rim, with the first retainer releaseably engaging the channel.

24. The apparatus defined in claim 21, wherein the spaced-apart retainers and the first retainer are each made of metal.

\* \* \* \* \*